United States Patent [19]

Orain

[11] Patent Number: 5,290,202
[45] Date of Patent: Mar. 1, 1994

[54] TELESCOPIC UNIVERSAL TRANSMISSION JOINT EMPLOYING INTERMEDIATE BLOCK ELEMENTS HAVING CYLINDRICAL AND SPHERICAL BEARING SURFACES

[75] Inventor: Michel Orain, Conflans-Ste-Honorine, France

[73] Assignee: Glaenzer Spicer, Poissy, France

[21] Appl. No.: 602,972

[22] Filed: Oct. 26, 1990

[30] Foreign Application Priority Data

Nov. 17, 1989 [FR] France .................. 89 15105

[51] Int. Cl.[5] ............................................. F16D 3/205
[52] U.S. Cl. ................................. 464/111; 464/120; 464/132; 464/905
[58] Field of Search ............. 464/111, 122, 120, 132, 464/905

[56] References Cited

U.S. PATENT DOCUMENTS

| | | | |
|---|---|---|---|
| 2,599,596 | 6/1952 | Wildhaber | 464/157 |
| 2,952,144 | 9/1960 | Holmes, Jr. | 464/132 |
| 3,381,497 | 5/1968 | Allen | 464/122 |
| 4,167,860 | 9/1979 | Sakaguchi et al. | 464/111 |
| 4,565,540 | 1/1986 | Orain | 464/111 |
| 4,881,923 | 11/1989 | Orain | 464/111 |
| 4,988,327 | 1/1991 | Orain | 464/111 |

FOREIGN PATENT DOCUMENTS

| | | |
|---|---|---|
| 0202968 | 11/1986 | European Pat. Off. . |
| 2702940 | 7/1977 | Fed. Rep. of Germany . |
| 3219187 | 7/1986 | Fed. Rep. of Germany . |
| 2191656 | 2/1974 | France . |
| 2525306 | 6/1984 | France . |
| 2580751 | 10/1986 | France . |
| 2622653 | 5/1989 | France . |
| 2628803 | 9/1989 | France . |
| 149504 | 9/1920 | United Kingdom . |
| 206101 | 11/1923 | United Kingdom . |
| 2199638 | 7/1988 | United Kingdom . |

*Primary Examiner*—Daniel P. Stodola
*Attorney, Agent, or Firm*—Wenderoth, Lind & Ponack

[57] ABSTRACT

A joint comprises a tripod equipped with three spherical pivots, and a barrel with six cylindrical inner tracks. Intermediate elements comprise a cylindrical surface complementary with the spherical pivot and a surface of circular profile complementary with the circular profile of the tracks. The intermediate elements are blocks, the surface of circular profile of which is a cylindrical surface permanently bearing slidably in the tracks. The joint enables reducing the contact pressures, increasing the telescopic stroke, simplifying the form of the intermediate elements and making it possible to produce them from a material of moderate hardness.

16 Claims, 6 Drawing Sheets

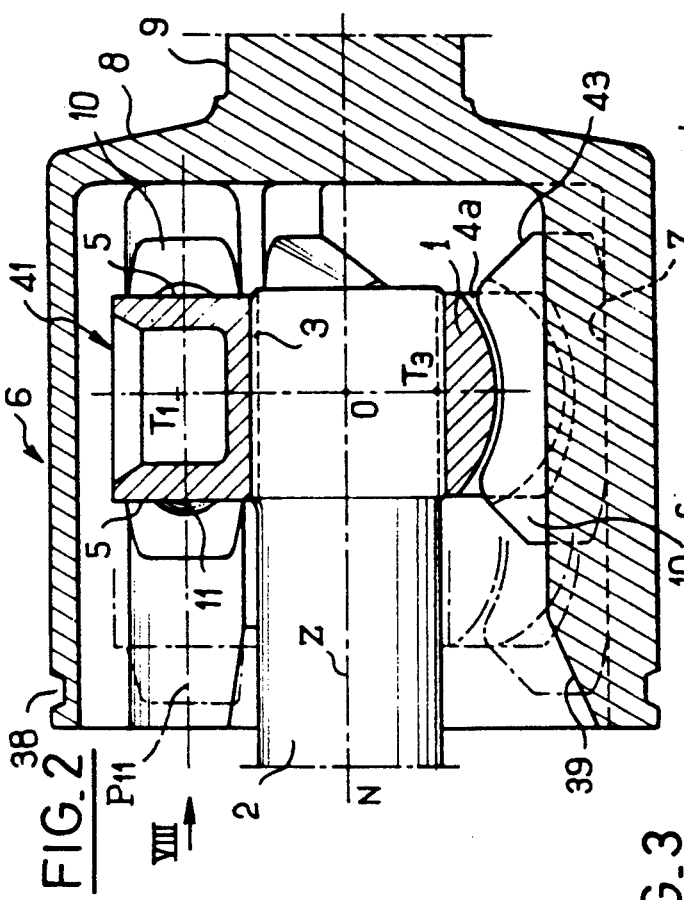
FIG. 2
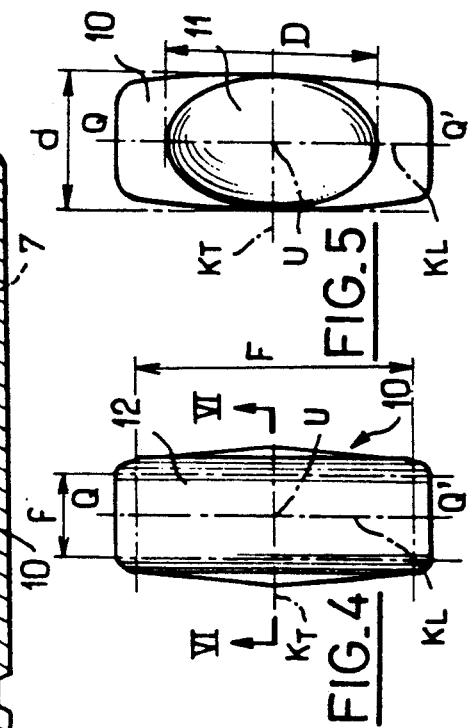
FIG. 5
FIG. 4
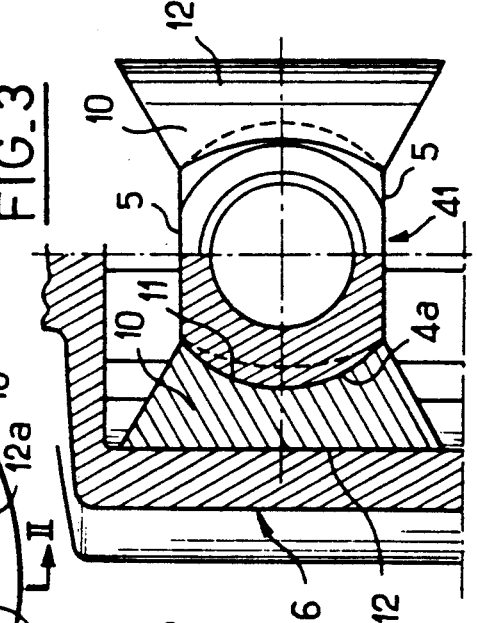
FIG. 3
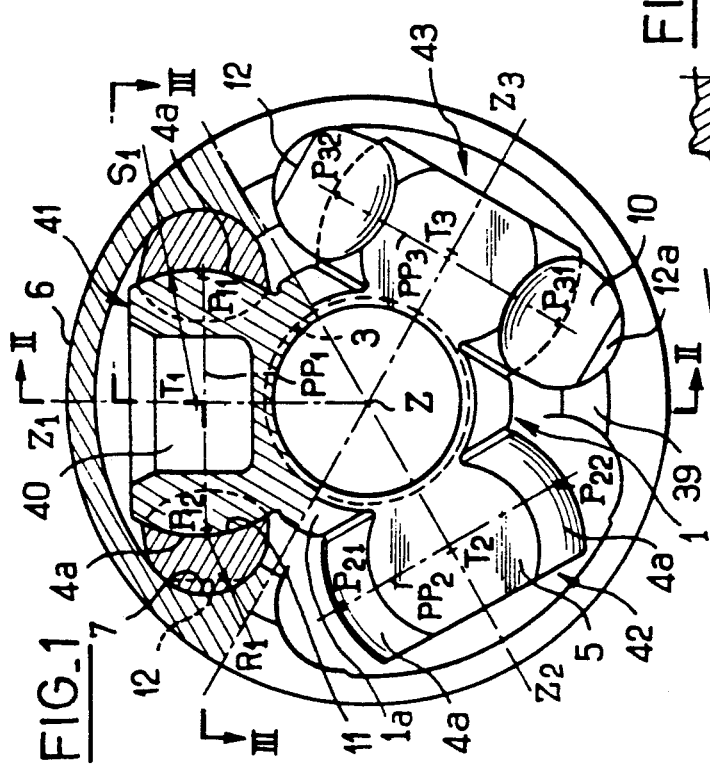
FIG. 1
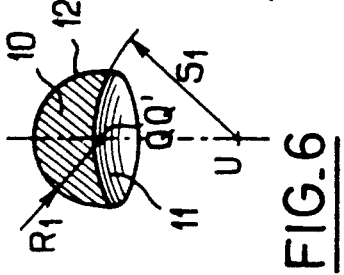
FIG. 6

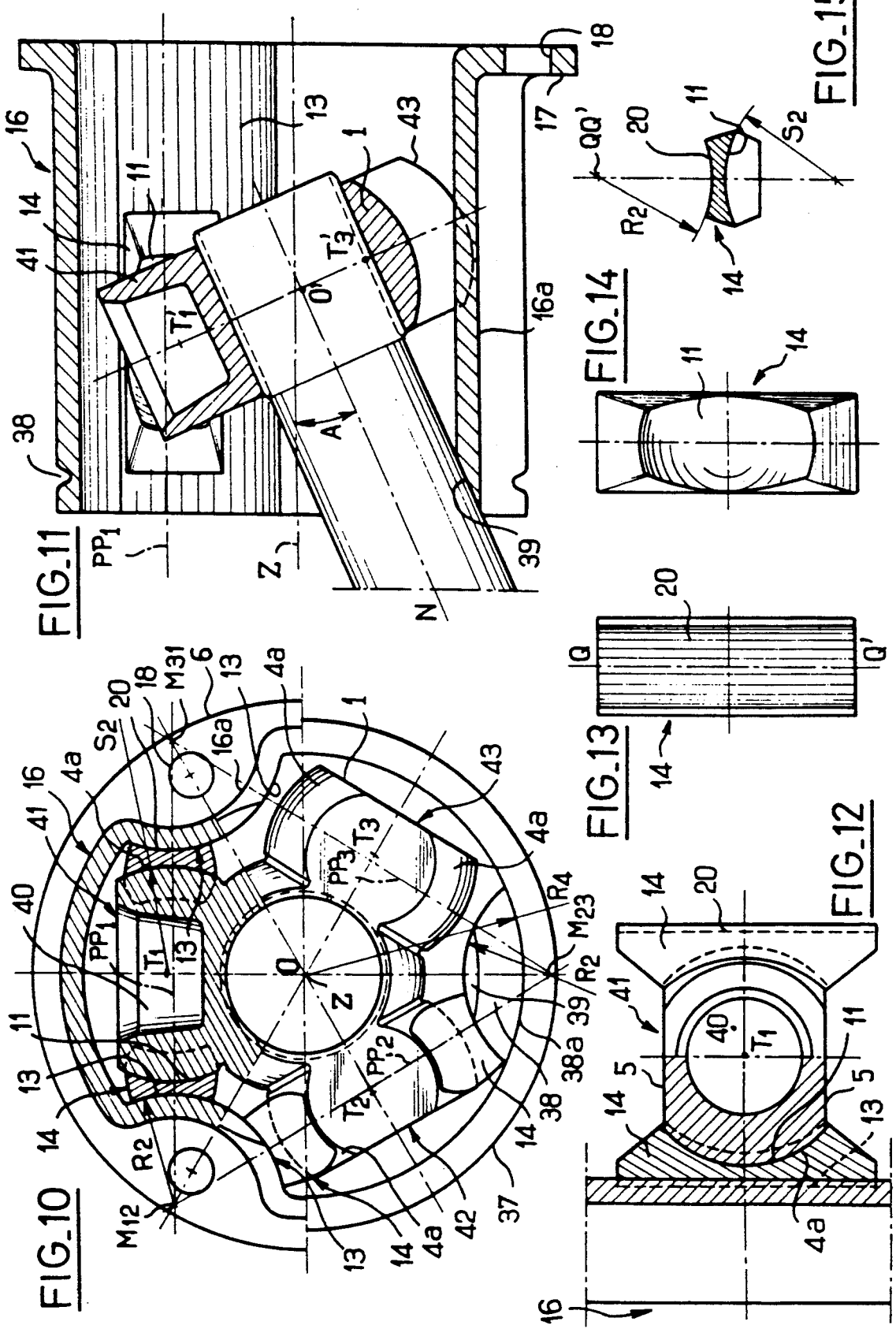

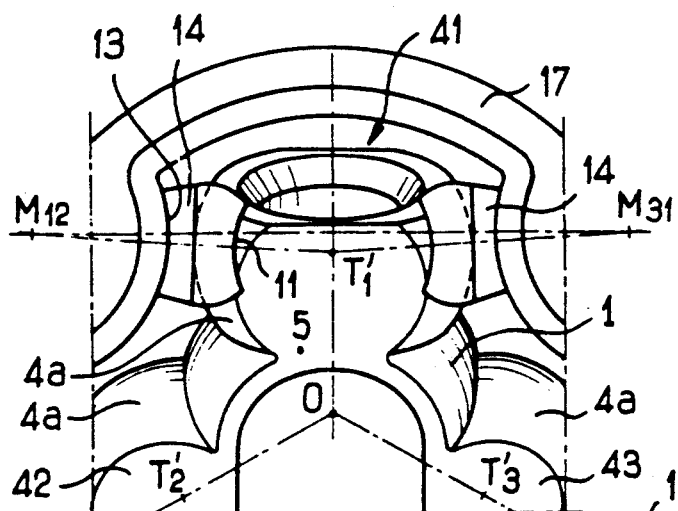
FIG. 16
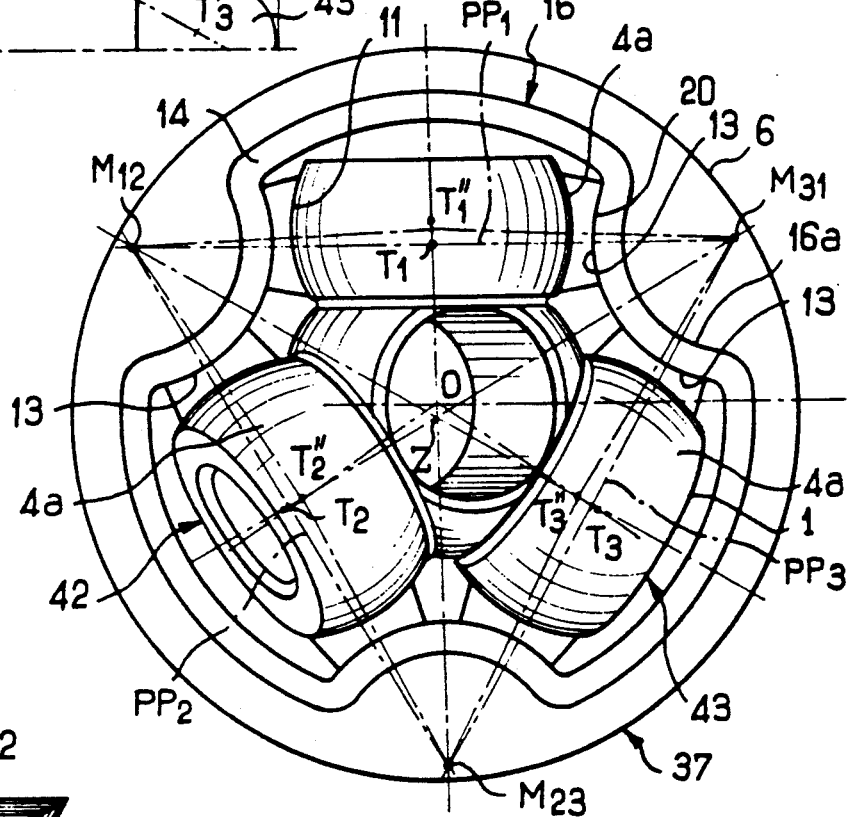
FIG. 17
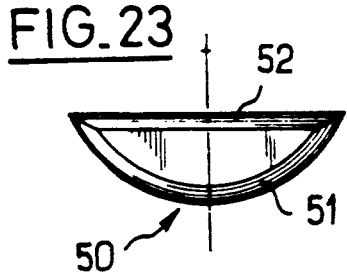
FIG. 23
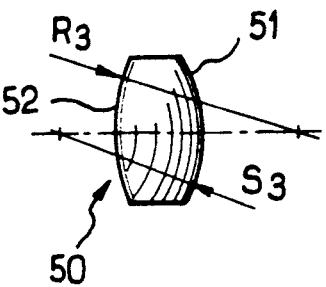
FIG. 22
FIG. 21

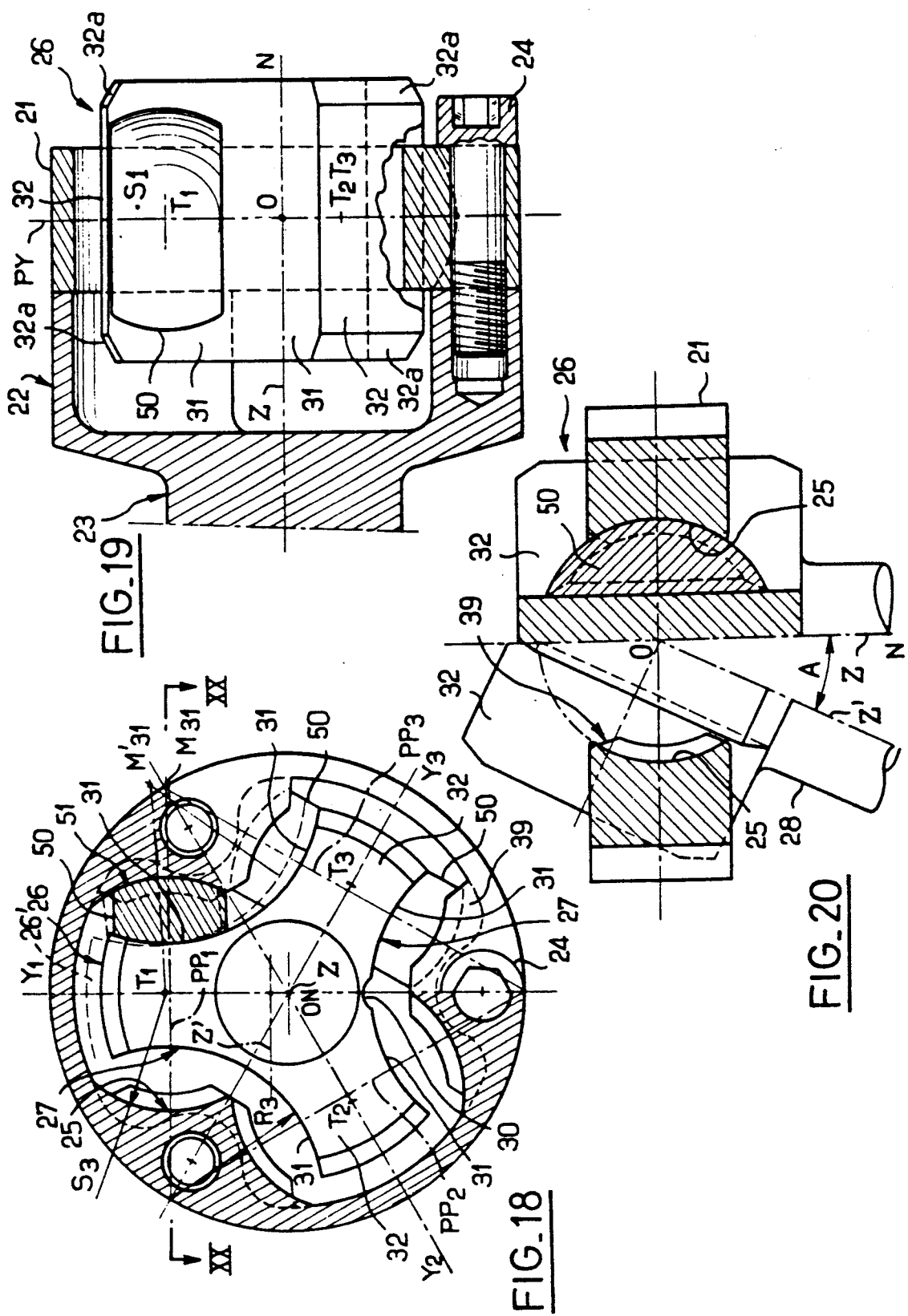

5,290,202

TELESCOPIC UNIVERSAL TRANSMISSION JOINT EMPLOYING INTERMEDIATE BLOCK ELEMENTS HAVING CYLINDRICAL AND SPHERICAL BEARING SURFACES

BACKGROUND OF THE INVENTION (1) Field of the Invention

The present invention relates to a telescopic universal transmission joint, especially for motor vehicles.

(2) State of the Prior Art

FR-A-2,607,883 makes known a homokinetic transmission joint comprising a tripod equipped with three arms arranged substantially radially relative to its axis and each partially surrounded by two roller segments, radially outer faces of curved transverse profile of which are in rolling contact with longitudinal tracks formed on the inner face of a hollow element of generally cylindrical, or "barrel", form, surrounding the tripod.

During operation, the axial component of the movements of each arm of the tripod in the barrel, such as result from the telescopic movement of the joint or from an operating mode at an angle, is, in principle, converted into a rolling without sliding of the roller segments on their respective track. This rolling movement is such that, when one arm of the tripod is directed towards either one of its axial stroke limits in the barrel, the associated roller segments move aside towards the rear of the arm in relation to the direction of the axial movement in question. This makes it possible, in principle, to give the joint a reduced axial bulk for a given capacity for axial and angular movement.

Furthermore, FR-A-2,607,883 teaches, as an improvement, to extend the toroidal rolling surface of the roller segments at each of its circumferential ends by a tangential cylindrical surface having the same transverse profile as the toroidal surface. At the end of rotation, this cylindrical surface comes to bear and slide on the rolling track with which it mates. This increases the effective expansion and contraction stroke of the joint.

FR-A-2,622,653 teaches various arrangements for compelling each roller segment to execute its rolling movement without sliding when the roller segment travels along the associated longitudinal track.

These known joints have notable mechanical qualities. The rolling without sliding in the longitudinal tracks of the barrel eliminates friction, whilst the pivoting/oscillation combination between spherical bearing surfaces of the roller segments and the arms of the tripod represents a movement without a stopping point which is very favourable to hydrodynamic lubrication and to the self-polishing of the surfaces.

However, the rolling surfaces, that is to say the toroidal outer surface of each segment and the corresponding longitudinal track of the barrel, are in Hertzian contact, that is to say a contact theoretically along a line and in practice over a small area adjacent to this line, under a relatively high pressure attributable to the load to be transmitted. This makes it necessary for these surfaces to be very hard. Moreover, the load reversals capable of abruptly breaking and remaking this contact can be noisy. To remedy this, a high production accuracy or pairing during assembly can be adopted, but of course this is more costly.

SUMMARY OF THE INVENTION

The object the invention is, therefore, to provide a telescopic universal transmission joint even more compact, more economical and quieter than the known joints.

The invention is thus aimed at a telescopic universal transmission joint, especially for motor vehicles, comprising a first element and a second element connected to each other in an articulated and telescopic manner by means of six intermediate elements, which each comprise:

a substantially spherical surface respectively bearing slidably on one of six complementary, substantially spherical bearing regions belonging to the first element and having centers distributed about an axis of the first element; and a surface of substantially circular cross-section which comprises a cylindrical region and which bears respectively on one of six substantially cylindrical longitudinal tracks of complementary profile belonging to the second element and having axes distributed about an axis of the second element.

According to the invention, the joint is characterized in that each intermediate element is a block, the cylindrical region of which bears permanently and slidably on the corresponding cylindrical track of the second element.

Thus, the blocks bear on the two elements under relatively low pressures distributed over sliding surfaces, the area of which is increased considerably in relation to the rolling contact of the known roller segments in their rolling track. Consequently, the component material of the contact surfaces of the blocks and of the second element can be much less hard than the rolling surfaces of the state of the art. The cost of material and the manufacturing cost can therefore be lowered. An additional cost reduction is obtained because the substantially cylindrical sliding surface of the blocks is easier to produce than the toroidal rolling surface of the rolling segments of the state of the art.

In the event of a load reversal, the take-up of the circumferential play does not generate any shock because it is damped by the oil film interposed between the spherical bearing surfaces of the first element and the block, and between the cylindrical sliding surfaces of the block and the second element.

Furthermore, the joint according to the invention can have a very long sliding stroke, without there being any need for additional means to achieve this.

Finally, the joint according to the invention has the following simultaneous advantages in comparison with the prior art:

simplicity and low cost of construction;

a long lifetime, robustness and a small bulk; and silent homokinetic operation, even during reversals of direction of the torque, with a filtration of the axial vibrations.

BRIEF DESCRIPTION OF THE DRAWINGS

Other particular features and advantages of the invention will also emerge from the following description, taken together with the accompanying drawings, given by way of non-limiting examples, wherein:

FIG. 1 is a partially cross-sectional end view of a joint according to the invention, a shaft of a tripod and two blocks not being mounted;

FIG. 2 is a sectional view along plane II—II of FIG. 1, the shaft of the tripod being mounted;

FIG. 3 is a diagrammatic sectional view along line III—III of FIG. 1, the right-hand part of the joint being shown only partially;

FIG. 4 is a plan view of a block towards the cylindrical bearing surface;

FIG. 5 is a plan view of a block towards the spherical bearing surface;

FIG. 6 is a sectional view along plane VI—VI of FIG. 4;

FIGS. 10 to 17 are views respectively similar to those of FIGS. 1, 7, 3, 4, 5, 6, 8 and 9, but relate to a second embodiment of the invention;

FIG. 18 is a view similar to that of FIG. 1, but relating to a third embodiment of the invention, the blocks not being shown in the left half of the figure;

FIG. 19 is an elevation view of the tripod of FIG. 18, with an axial section through the bowl;

FIG. 20 is a view of the joint along plane XX—XX of FIG. 18 in two attitudes of the internal element in relation to the barrel;

FIG. 21 is an end view of one of the blocks of FIGS. 18 to 20;

FIG. 22 is a plan view of the block of FIG. 21 towards the cylindrical bearing surface;

FIG. 23 is an elevation view of the block of FIGS. 21 and 22;

DETAILED DESCRIPTION OF THE PREFERRED EMBODIMENTS

Figure 7:
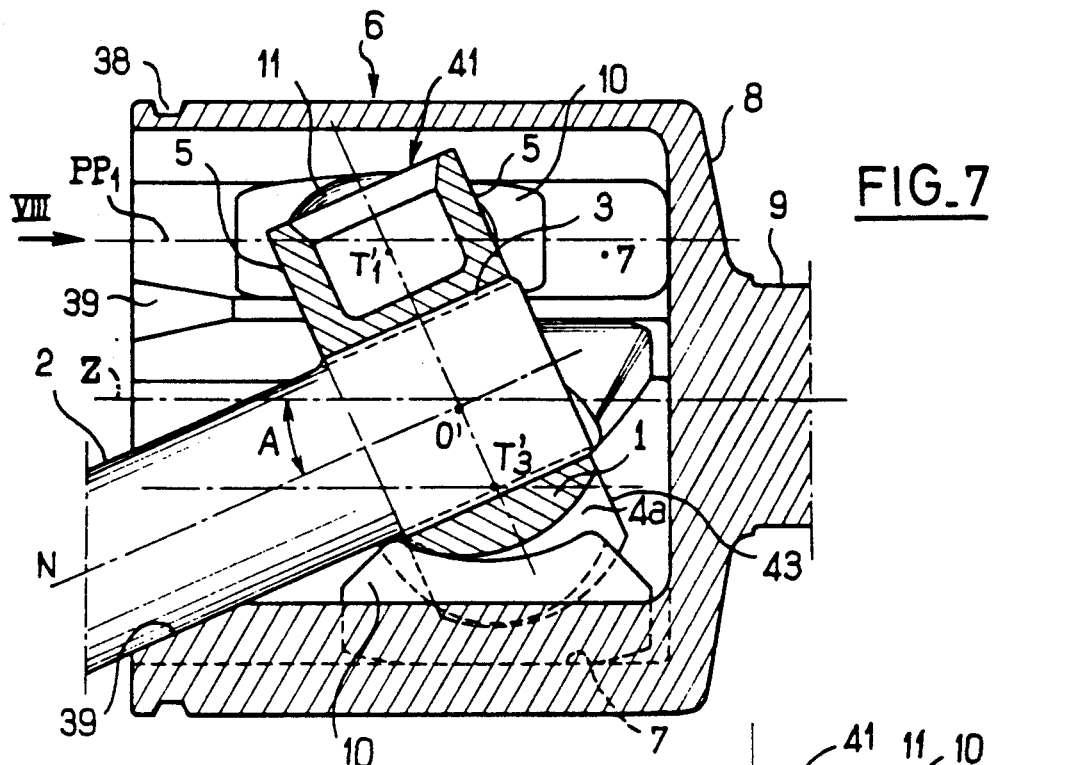
FIG. 7 is a view similar to that of FIG. 2 when the joint is operating at a bending angle and at the moment when the axis of the upper arm of the tripod is perpendicular to the bending axis of the joint.

In the example illustrated in FIGS. 1 to 9, a transmission joint of the homokinetic type serves as an articulated and telescopic connection and for ensuring the transmission of torque between a shaft 9, which can be connected to a drive source of a vehicle, and a shaft 2, which can be the output shaft of the joint connected to a driving wheel of a motor vehicle. The joint comprises a first element consisting of a tripod 1, itself comprising a ring 1a which is fitted on to the shaft 2 and which is made integral with the shaft 2 in terms of rotation about the common axis ON of the ring and of the shaft 2 by means of conventional splines or by any other suitable means.

The tripod 1 comprises, furthermore, three spherical pivots 41, 42 and 43 integral with the ring 1a and extending radially outwards from the latter. The centers $T_1$, $T_2$ and $T_3$ of the pivots are distributed uniformly about the axis ON and are all three arranged in the same plane intersecting the axis ON perpendicularly at a point O. Moreover, the centers $T_1$, $T_2$ and $T_3$ are at an equal distance from the axis ON.

The spherical pivots 41, 42, and 43 each comprise two convex spherical bearing regions 4a, which belong to the same ideal sphere of respective centers $T_1$, $T_2$ and $T_3$, depending on the particular pivot.

On each pivot, the two spherical bearing regions 4a are in general terms diametrically opposite each other. The two spherical bearing regions 4a of each pivot could belong to the same spherical zone extending over the entire periphery of the pivot. This may be preferable for carrying out the final grinding. However, in the example illustrated, the spherical pivots are truncated by two mutually opposed flats 5 which are perpendicular to the axis ON of the tripod 1 and which limit the axial thickness of the tripod to that necessary for the ring 1a, allowing for the torque to be transmitted by the splines 3. Thus, in the example illustrated, the spherical bearing regions 4a are separated circumferentially from each other by the flats 5 on each pivot 4.

The joint comprises, furthermore, a second element consisting of a barrel 6 of generally cylindrical form, which carries internally six longitudinal tracks 7 having a substantially circular concave transverse profile of radius $R_1$. The pivot 41 extends between the tracks 7 of axes $P_{11}$ and $P_{12}$, and each of its spherical bearing regions 4a respectively confronts one of these two tracks. The same is true of the pivot 42 in relation to the tracks of axis $P_{21}$ and $P_{22}$, and of the pivot 43 in relation to the tracks $P_{31}$ and $P_{32}$.

The barrel 6 forms part of a "bowl" also possessing a bottom 8 which connects the barrel 6 to the power take-off shaft 9 of a vehicle. The axes of the tracks 7 are parallel to the axis Z of the shaft 9 and are located at an equal distance from the latter.

The axes $P_{11}$ and $P_{12}$ of the two tracks 7 located on either side of the pivot 41 are arranged symmetrically on either side of a half-plane $ZZ_1$ originating from the axis Z and passing through the center $T_1$. The same is true of the axes $P_{21}$ and $P_{22}$ in relation to the half-plane $ZZ_2$ passing through the center $T_2$, and of the axes $P_{31}$ and $P_{32}$ in relation to the half-plane $ZZ_3$ passing through the center $T_3$.

As shown in FIG. 1, when the joint is aligned (the axes ON and Z coinciding), each pivot center $T_1$, $T_2$ or $T_3$ is located at a very small radial distance beyond the plane $PP_1$, $PP_2$ or $PP_3$ to which belong the two axes (for example, $P_{11}$ and $P_{12}$ for the pivot of centre $T_1$) of the two tracks 7 located on either side of this pivot.

The articulated connection between the barrel 6 and the tripod is made by means of six blocks 10, each of which is interposed between one of the tracks 7 and the spherical bearing region 4a located opposite. Each block 10 comprises a concave spherical surface 11 which is of the same radius $S_1$ as the spherical bearing regions 4a and which is in sliding contact with the corresponding spherical bearing region 4a of the tripod. Thus, in the mounted state, the center U of the concave spherical surface 11 of each block 10 (FIG. 6) coincides with the center $T_1$, $T_2$ or $T_3$ of the corresponding pivot (FIG. 1).

Each block 10 comprises, furthermore, a convex cylindrical surface of circular cross-section 12, of axis QQ' (FIGS. 4 and 6) and of radius $R_1$ equal to the radius $R_1$ of the circular profile of the tracks 7. During operation, the convex cylindrical surfaces 12 are in contact with the concave tracks 7, the axes QQ' of the surfaces 12 coinciding respectively with the axes $P_{11}$, $P_{12}$, $P_{21}$, $P_{22}$, $P_{31}$ and $P_{32}$ of the tracks 7 machined inside the barrel.

The center U and the axis QQ′ of each block 10 belong to the same principal plane of symmetry $K_L$ of the block. A transverse plane of symmetry $K_T$ of the block passes substantially through the, center U perpendicularly relative to the axis QQ′.

The blocks 10 are capable of sliding along the tracks 7 and of oscillating about the abovementioned axes in the tracks 7 as a result of their sliding contact with the latter. Moreover, the blocks 10 are capable of pivoting and of oscillating on the pivots 4 as a result of the sliding contact between the concave spherical surfaces 11 of the blocks 10 and the spherical bearing regions $4a$ of the pivots 4.

Each block 10 is thus held, guided and oriented in all directions between one of the convex spherical bearing regions $4a$, centered at $T_1$, $T_2$ or $T_3$, of a pivot 41, 42 or 43 and the cylindrical surface of radius $R_1$ and of axis $P_{11}$, $P_{12}$, $P_{21}$, $P_{22}$, $P_{31}$ or $P_{32}$ of a track, this axis coinciding with its axis QQ′, thereby ensuring that it has an exact longitudinal orientation in relation to the barrel, whatever the operating configuration of the joint.

Figure 8:
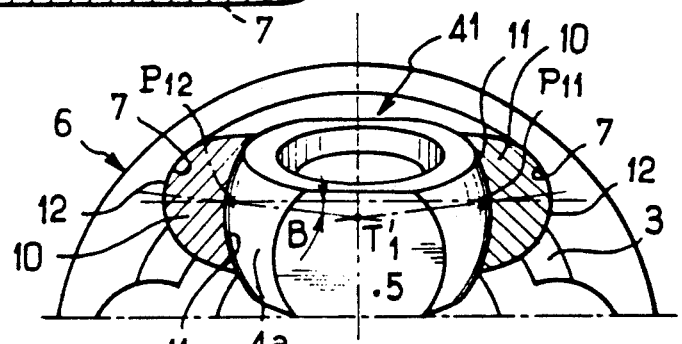
FIG. 8 is a view according to arrow VIII of FIG. 7, the blocks being in cross-section.

The joint which has just been described operates as follows:

When the joint changes from its aligned configuration (FIGS. 1 and 2) to a configuration where the axis ON of the shaft 2 is inclined at an angle A, called the "bending angle of the joint", relative to the axis Z of the barrel 6 (FIG. 7) about an axis perpendicular to the axis of one of the pivots (in FIG. 7, the inclination A has taken place about an axis perpendicular to the axis $OT'_1$ of the pivot 41), the center of the pivot 41 changes from the position $T_1$ shown in FIG. 1 and located beyond the plane $PP_1$ to the position $T'_1$ shown in FIG. 7 and located radially on this side of the plane $PP_1$. As shown in FIG. 8, this is possible as a result of an inclination B assumed by the two blocks 10 associated with this pivot about their axes which coincide with the axes $P_{11}$ and $P_{12}$ of the tracks 7 in which they are located. At the same time, as shown in FIG. 7, the pivot 41 is inclined at the angle A relative to the two associated blocks 10 (only one of which can be seen in FIG. 7). This inclination is allowed by the sliding spherical contact between the concave spherical surface 11 of these two blocks 10 and the two spherical bearing regions $4a$ of this pivot.

At the same time, the centers $T_2$ and $T_3$ remain at a constant radial distance from the axis Z of the barrel, and the center of the tripod comes to O′.

When the shafts 2 and 9 rotate about their respective axes, whilst the geometrical axis Z of the axle stub remains stationary in the position shown in FIG. 7, during a complete revolution of the device the pivot 4 of center $T'_1$ will successively assume the positions $T'_2$ (not shown) and $T'_3$, before returning to the position $T'_1$, the corresponding block 10 executing a to-and-fro movement over a specific stroke by sliding along its track 7 and, at the same time, an oscillating movement about its axis QQ′ in the track 7, in view of the variations of the angle B (FIG. 8) during a revolution of the joint.

Figure 9:
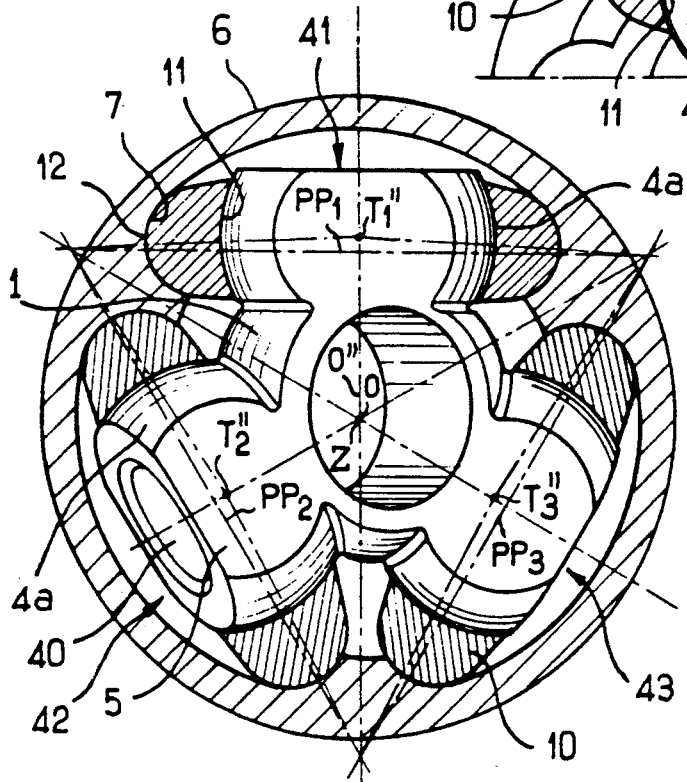
FIG. 9 is a front view of the joint operating at a bending angle and at the moment when the axis of one of the arms of a tripod coincides with the bending axis of the joint, the blocks and the barrel being in cross-section.

During its rotation, the pivot 41 also assumes, twice in each revolution, a notable position in which the axis $OT_1$ of the pivot coincides with the axis about which the joint forms the bending angle A. This situation is illustrated in FIG. 9. To make a comparison with the other figures easier, this time the case of a vertical bending axis of the joint has been chosen, the pivot $T_1$ therefore still being in the high position. The rotation of the tripod about the axis $OT_1$ brings the centers of the other two pivots 42 and 43 into positions $T''_2$ and $T\Delta_3$ nearer the plane containing the axes Z and $OT_1$ than the positions $T_2$ and $T_3$. In particular, the positions $T''_2$ and $T''_3$ are nearer the axis Z than the positions $T_2$ and $T_3$. And because the centers of these two pivots can move closer to and further from the axis Z only by remaining in the plane of symmetry of the two tracks 7 respectively associated with them, this movement bringing the centers of the pivots 42 and 43 closer in relation to the axis Z has a component directed towards the top of FIG. 9. Consequently, the tripod moves slightly towards the top of FIG. 9 in relation to the barrel 6. The centre O changes to the position O″, and the center of the pivot 41 assumes a position $T'''_1$ located radially beyond the position $T_1$. The blocks 10 associated with the pivot 41 are inclined towards the top of FIG. 9 so as to allow this position $T'''_1$ of the center of the pivot 41.

Of course, during the rotation, the pivots are most often in a position which can be referred to as any position in relation to the bending axis of the joint. In this case, the relative displacement of the blocks is a superposition of the movements described for the two particular positions described with reference to FIGS. 7 to 9.

When a pivot center, such as $T_1$, moves to the position $T'_1$ (FIG. 7), the circumferential play of the pivot between the two associated tracks 7 begins by decreasing, until the center passes into the plane $PP_1$, after which the play starts to increase again. However, these variations of play are very slight because the center of the pivot is always at a small distance from one side or the other of the associated plane, such as $PP_1$.

The transmission joint according to the invention has many advantages:

the invention makes it possible to give the blocks an appreciable elongation in the direction of their principal movement in relation to the barrel, that is to say the sliding direction in parallel with the axis of the barrel; thus, the contact pressure between the blocks and the barrel is low and there are favourable conditions for generating a continuous hydrodynamic film of lubricant between the blocks and the barrel;

the blocks are of simple form;

the blocks have a low coefficient of sliding pressure and of bending stress, and there are no longer any Hertzian pressures, that is to say pressures resulting from a theoretically point or linear contact.

The blocks according to the invention can therefore be produced from a material highly advantageous both technically for their sliding quality and economically for their low operating cost. Suitable materials are, for example, plastic, reinforced or not, porous sintered metals impregnated with lubricant, steels coated with nylon, various alloys based on copper, lead or tin, etc.

The cold swaging of blocks made of steel or other metals is easy because of the simplicity of the forms of the active surfaces.

Finally, the large complementary sliding bearing surfaces make it possible not only to carry out a continuous hydrodynamic lubrication, but also, this being a second important advantage, to ensure an effective damping suppressing shocks which would otherwise occur during the take-up of the circumferential plays when the direction of the torque to be transmitted is abruptly reversed.

The blocks 10 have a form elongated parallel with their axis QQ′ which is also the direction of their principal movement in relation to the barrel 6 and to the spherical bearing regions $4a$ of the pivots of the tripod. This particular feature not only enhances the directional stability of the blocks 10 on the tracks 7 and the extent of their bearing surface on the tracks 7, but also increases their bearing surface on the pivots 41, 42 or 43. It is advantageous if the effective bearing surface over which the spherical surface 11 of the blocks bears on the spherical bearing region 4a of the pivots possesses, as seen in a plan view, a longitudinal dimension D (FIG. 5) parallel to the axis QQ' which is equal to 1.5 to 2.5 times its width d. Furthermore, the effective bearing surface between the cylindrical surface 12 of the blocks 10 and that of the tracks 7 advantageously has a ratio F/f at least equal to 4, in which expression F and f are respectively the axial length and the width of the effective bearing surface, as seen in a plan view (FIG. 4).

By effective bearing surface is meant that part of the surfaces 11 and 12 which are normally in contact, respectively, with the regions 4a and tracks 7.

If the blocks are elongated, that is to say have a high length/width ratio, the deformations, especially as regards bending, which occur during operation in each of the pivot/block/track assemblies which are under load (in each direction of the torque to be transmitted there are three such assemblies under load and three others under no load) have the effect of relieving the two ends of each of the two respectively cylindrical and spherical effective bearing surfaces. This is beneficial to the formation and maintenance of the hydrodynamic lubrication film when the joint is operating at an angle and under load.

In the example illustrated in FIGS. 10 to 17, which will be described only with regard to its differences from the preceding one, longitudinal tracks 13 of the barrel are convex cylindrical tracks which have a cross-section in the form of a segment of a circle of radius $R_2$ and the axes $M_{12}$, $M_{23}$ and $M_{31}$ of which are located beyond the active surfaces of these tracks in relation to the center $T_1$, $T_2$ or $T_3$ of the associated pivot 41, 42 or 43.

As is also shown in FIGS. 10 to 17, it is advantageous if each axis $M_{12}$, $M_{23}$ or $M_{31}$ is common to two adjacent tracks interacting with two different pivots. Each pair of tracks 13 having a common axis $M_{12}$ or $M_{23}$ or $M_{31}$ is formed by two longitudinal regions, extending side by side, of the same convex cylindrical surface confronting the axis Z of the barrel. Thus, the cylindrical active surface of axis $M_{12}$ receives both one of the blocks 14 bearing on the pivot 41 and one of the blocks 14 bearing on the pivot 42, the cylindrical surface of axis $M_{23}$ receives two blocks 14 (only one of which is shown) interacting respectively with the pivots 42 and 43, and the cylindrical surface of axis $M_{31}$ receives the bearing of two blocks 14, only one of which is shown, and which interacts respectively with the pivots 43 and 41.

Furthermore, as in the example of FIGS. 1 to 9, the planes $PP_1$, $PP_2$ and $PP_3$, which each contain the two axes $M_{12}$ and $M_{31}$ or $M_{23}$ and $M_{12}$ or $M_{31}$ and $M_{23}$ of the two tracks 13 located on either side of each pivot 41, 42 or 43, pass substantially through the center $T_1$, $T_2$ or $T_3$ of the associated pivot. Under these conditions:

$$OT_1 = ZM_{12} \times \cos 60°$$

Consequently:

$$ZM_{12} = 2 \times OT_1.$$

In this expression:

$OT_1$ = the distance between the point O and the center $T_1$ $ZM_{12}$ = the distance between the axis Z and the axis $M_{12}$.

This results in an appreciable simplification of the production of the tracks 13 and in the best possible capacity/bulk ratio. However, it will be understood that the contiguous tracks could have a cross-section formed from two secant arcs of a circle of a radius larger or smaller than $R_2$.

In the upper part of FIG. 10 and in FIGS. 11, 12, 16 and 17, the barrel 16 is shown with a substantially constant thickness, thus making it possible to produce it from deep-drawn sheet metal. It then possesses, at its end, a fastening flange 17 for connecting it to a bottom, such as the bottom 8 of FIG. 2. The cylindrical convex form of the tracks 13 defines, on the outer peripheral surface of the barrel 16, longitudinal recesses 16a which make it possible to engage fastening screws (not shown) for the flange 17 through holes 18 made in this flange opposite the recesses 16a.

In the version illustrated at the bottom of FIG. 10, the barrel consists of a tube 37, the outer wall of which is cylindrical and the likewise cylindrical inner wall of which carries three biconvex longitudinal strips 38 having a radially outer surface 38a complementary with the inner wall of the tube 37 and applied against this, and a radially outer wall of radius $R_2$ defining two adjacent tracks 13 intended for interacting with two blocks 14 bearing on two different pivots. The strips 38 can be fastened to the tube 37 by bolting, welding, adhesive bonding, etc. The tripod of the embodiment of FIGS. 10 to 17 is similar to that of FIGS. 1 to 9.

Each of the blocks 14 comprises a concave spherical surface 11 bearing slidably against a convex spherical bearing region 4a of one of the pivots and a likewise concave cylindrical surface 20 of axis QQ' and radius $R_2$, which is opposite the spherical surface 11 and which bears slidably against one of the tracks 13.

In the mounted state, the center of the spherical surface 11 of each block 14 coincides with the center $T_1$, $T_2$ or $T_3$ of the associated pivot, and the axis QQ' of the block coincides with the axis $M_{12}$, $M_{23}$ or $M_{31}$ of the associated track 13.

The embodiment of FIGS. 18 to 23 will be described only in terms of its differences from that of FIG. 1.

The axially very short barrel 21 is fastened to the annular end surface of a cup-shaped flange 22, the concavity of which confronts the barrel 21. The bottom of the cup is connected in one piece to a power take-off shaft 23, which can be a motor-vehicle axle stub. The barrel 21 is fastened to the flange 22 by means of hexagon-socket screws 24 extending axially.

In this embodiment, the barrel 21 forms the first element of the joint, in that it is this which possesses internally three pairs of spherical bearing regions 25 which are concave and of radius $S_3$. The two spherical regions 25 of each pair are respectively arranged symmetrically on either side of one of three half-planes $OY_1$, $OY_2$ and $OY_3$ originating from the axis ON of the barrel and distributed angularly at 120° relative to one another about this axis. Moreover, the two spherical bearing regions 25 of each pair belong to the same ideal sphere, the center $T_1$, $T_2$ or $T_3$ of which is therefore located on the corresponding half-plane of symmetry $OY_1$, $OY_2$ or $OY_3$. The centers $T_1$, $T_2$ and $T_3$ of the spherical bearing surfaces are located in a same plane PY (FIG. 19) perpendicular to the axis ON of the barrel 21 at O.

The joint of FIGS. 18 to 23 also possesses, as a second element, an inner driving element 26 which comprises three concave cylindrical surfaces 27 of radius $R_3$ and of axis $M_{12}$, $M_{23}$ and $M_{31}$ parallel to the axis Z of the driving element 26 and of an input shaft 28 with which the driving element 26 is integral. The axes $M_{12}$, $M_{23}$ and $M_{31}$ are uniformly distributed about the axis Z. When the joint is aligned, the plane $PP_1$ containing the axes $M_{12}$ and $M_{31}$ extends between the axis ON and the centre $T_1$ at a very short distance from the center $T_1$. The same is true of the plane $PP_2$ containing the axes $M_{12}$ and $M_{23}$ in respect of the center $T_2$ and of the plane $PP_3$ containing the axes $M_{23}$ and $M_{31}$ in respect of the center $T_3$.

Six biconvex cylindrical and spherical intermediate elements or blocks 29 are each interposed between one of the spherical bearing surfaces 25 of the barrel 21 and a track 31 consisting of a longitudinal part of one of the concave cylindrical surfaces 27. Each concave cylindrical surface 27 thus defines two tracks 31 extending longitudinally side by side. The two tracks 31 of the same surface 27 support two blocks 29 bearing on two spherical bearing regions 25 which succeed one another circumferentially, but which have two different centers.

Each block 29 comprises a convex spherical surface 51 of radius $S_3$ complementary with the concave spherical bearing region 25 of the barrel 21 and, on its opposite face, a convex cylindrical surface 52 of radius $R_3$ complementary with the concave cylindrical track 31 of the inner element 26. In the joint in the mounted state, the center of the convex spherical surface 51 of each block coincides with the center $T_1$, $T_2$ or $T_3$ of the spherical bearing region 25 of the barrel 21 on which it bears, and the axis of the convex cylindrical surface 52 coincides with the axis of the track 31 which bears on it.

The inner driving element 26 thus has the form of an element with three blades 32 extending in axial half-planes distributed at 120° relative to one another about the axis Z, each concave cylindrical surface 27 extending on two successive blades 32, each blade extending between two concentric spherical bearing surfaces 25. The blades 32 each comprise two end bevels 32a for increasing the maximum acceptable angle A in view of the available space within the bowl.

FIG. 18 shows two alternative embodiments of the cylindrical surface 27. The two upper cylindrical surfaces 27 are continuous. In contrast, the lower concave cylindrical surface 27 is discontinuous: a longitudinal groove 30 separates the two tracks 31.

The concave spherical bearing regions 25 can be produced economically by cold forming by means of an expansion tool.

In this third embodiment of the joint according to the invention, the sliding corresponding to the telescopic movement of the joint occurs on the inner element 26 and no longer, as in the preceding embodiments, on the barrel. FIGS. 18 and 19 show the joint mid-way along its sliding stroke. The left-hand part of FIG. 20 shows the joint at a bending angle A about the axis $OT_1$. The axis Z has assumed the position Z', the axis ON of the first element (barrel 21) being assumed to be stationary. As shown in FIG. 1, the position Z' is offset towards the center $T_1$ relative to the position Z. The axes of the cylindrical tracks are offset accordingly, as represented diagrammatically by the point $M'_{31}$ in FIG. 18. The plane $PP_1$ therefore moves radially beyond the center $T_1$, and the planes $PP_2$ and $PP_3$ move away from the centers $T_2$ and $T_3$ in the direction of the central axis of the barrel. Dashes 26' in FIG. 18 also show part of the contour of the driving element 26 in this situation.

Figure 24:
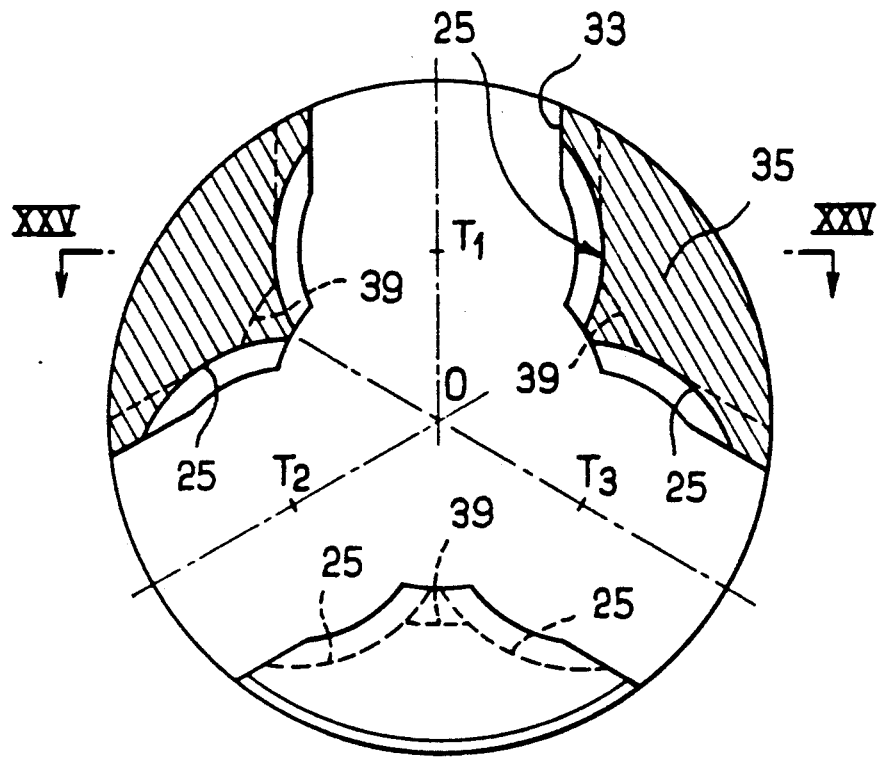
FIG. 24 is a partially cross-sectional end view of another embodiment of a bowl compatible with the internal element and the blocks of FIGS. 18 to 23.
Figure 25:
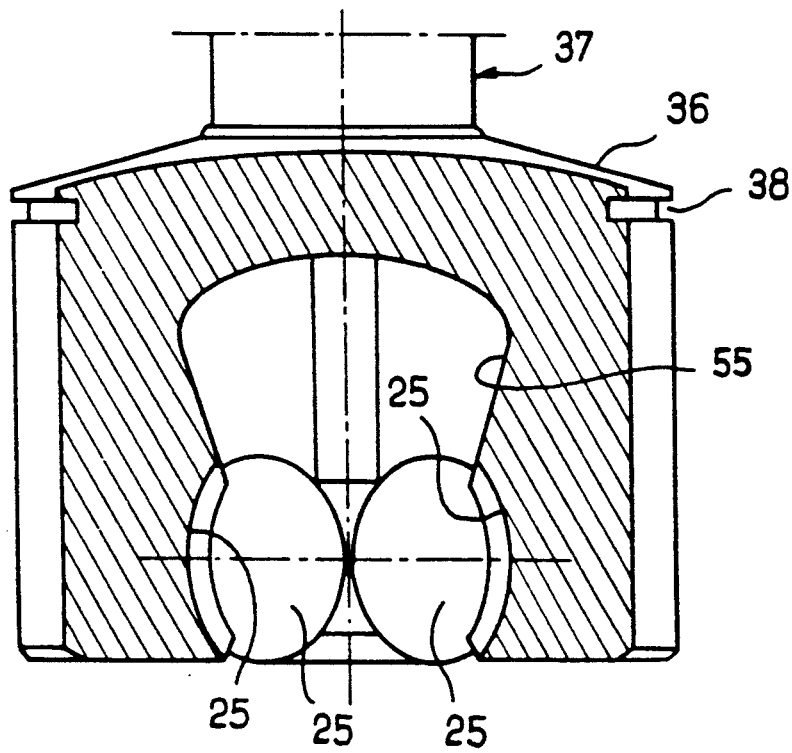
FIG. 25 is a section along plane XXV—XXV of FIG. 24.

FIGS. 24 and 25 show another embodiment of a bowl which can be used with the driving element and the blocks of the embodiment according to FIGS. 18 to 23.

The bowl is produced in one piece, but its barrel is open as a result of three indentations 33, each of which has on its two opposite faces two spherical bearing regions 25 of the same center $T_1$, $T_2$ or $T_3$ and of the same radius. When the joint is mounted, each indentation 33 receives one of the blades 32 of the driving element 26 and allows the angular movement of the latter as a function of the bending angle of the joint.

Furthermore, the three indentations 33 allow the passage of a wheel for grinding the concave spherical bearing regions 25. The assembly comprising the barrel 35, the bottom 36 and the axle stub 37 can be machined from a forging or stamping blank.

The interior of the barrel 35 widens towards the bottom 36 from the spherical bearing regions 25, to form an undercut region 55 between the regions 25 and the bottom 36.

In the three embodiments described, a trapezoidal slot 38 can be provided on the periphery of the barrel, intended for receiving the lug of a sealing bellows (not shown). It is also possible in the conventional way to provide chamfers 39 along the free annular edge of the barrel, in order to increase the angular movement of the tripod shaft of FIGS. 1 to 17 or of the inner element 26 of FIGS. 18 to 20.

Finally, the pivots of FIGS. 1 to 17 can have a central recess 40 in order to lighten them and adjust their flexibility.

Of course, the invention is not limited to the examples described and illustrated.

In the examples of FIGS. 10 to 25, all the cylindrical tracks could have different axes. As shown in FIG. 17, the pivots do not necessarily have the flats 5 of FIG. 3.

I claim:

1. A telescopic universal transmission joint, comprising:
    a first element having an axis and six complementary and substantially spherical bearing regions having centers distributed about said axis of said first element;
    a second element having an axis and six substantially cylindrical longitudinal tracks of complementary profile having axes thereof distributed about said axis of said second element; and
    six intermediate elements connecting said first element to said second element in an articulated and telescopic manner, each said intermediate element comprising a substantially spherical surface bearing slidably on a respective one of said six complementary and substantially spherical bearing regions of said first element and a surface of substantially circular cross-section, comprising a cylindrical surface, which bears on a respective one of said six substantially cylindrical longitudinal tracks of complementary profile of said second element, wherein each said intermediate element is a block and said cylindrical surface of said block bears permanently and slidably on the respective said substantially cylindrical longitudinal track of said second element.

2. The telescopic universal transmission joint of claim 1, wherein:
   each said intermediate element has a principal plane of symmetry, said substantially spherical surface thereof having a center and said cylindrical surface thereof having an axis both lying in said principal plane of symmetry; and
   each said intermediate element having a transverse plane of symmetry transverse to said principal plane of symmetry passing substantially through said center of said substantially spherical surface.

3. The telescopic universal transmission joint of claim 1, wherein said blocks are made of a material selected from a group comprising plastics, porous sintered metals, steel coated with plastic and alloys based on copper, lead or tin.

4. The telescopic universal transmission joint of claim 1, wherein said substantially spherical surface of each said block has an effective bearing surface against a said substantially spherical bearing region of said first element which has a longitudinal dimension, as measured parallel to the axis of said cylindrical surface of said block, between 1.5 to 2.5 times a transverse dimension thereof.

5. The telescopic universal transmission joint of claim 1, wherein said cylindrical surface of each said block has an effective bearing surface with an axial length along the axis of said cylindrical surface at least four times the width thereof.

6. The telescopic universal transmission joint of claim 1, wherein said centers of said substantially spherical bearing regions, when said axes of said first and second elements are coincident, are spaced radially outwardly of planes defined by adjacent pairs of said axes of said longitudinal tracks of said second elements.

7. The telescopic universal transmission joint of claim 1, wherein said substantially cylindrical longitudinal tracks have the same radius, and adjacent pairs of said tracks have a common axis.

8. The telescopic universal transmission joint of claim 7, wherein the distance between said common axes and said axis of said first element is substantially twice the distance between said centers of said substantially spherical bearing regions and said axis of said first element.

9. The telescopic universal transmission joint of claim 7, wherein said second element is a barrel having a profiled peripheral wall with a substantially constant thickness and an inner face, said longitudinal tracks being convex and defined by said inner face.

10. The telescopic universal transmission joint of claim 7, wherein said second element is a barrel having a deep-drawn peripheral wall, said peripheral wall having an inner face defining said longitudinal tracks as convex tracks thereon.

11. The telescopic universal transmission joint of claim 7, wherein said second element is a barrel comprising a supporting tube and said longitudinal tracks are convex and defined by strips attached to an inner face of said supporting tube of said barrel.

12. The telescopic universal transmission joint of claim 7, wherein said first element is a tripod having three pivots with two said substantially spherical bearing regions on each said pivot, and each said adjacent pair of tracks having a common axis is in contact with two respective said intermediate elements bearing on respective said substantially spherical bearing regions of two separate said pivots of said tripod.

13. The telescopic universal transmission joint of claim 7, wherein:
   said second element comprises three angularly spaced substantially axial blades;
   each said adjacent pair of tracks having a common axis extends on adjacent sides of two different said blades; and
   each said blade extends between two of said substantially spherical bearing regions of said first element which confront each other and are substantially concentric.

14. The telescopic universal transmission joint of claim 13, wherein said first element comprises a barrel attached to an annular end face of a cup-shaped flange, said barrel having a radially inner face with said substantially spherical bearing regions thereon.

15. The telescopic universal transmission joint of claim 13, wherein said first element comprises a barrel, said barrel forming an integral part of a bowl element and having three indentations defined therein for receipt of said blades of said second element, each indentation of said barrel having a substantially spherical bearing region defined on each of two sides of said barrel defining said indentations.

16. The telescopic universal transmission joint of claim 15, wherein said barrel of said element has an inner face and a bottom forming a part of said bowl element, said inner face defining an undercut recess axially between said substantially spherical bearing regions and said bottom.

* * * * *